United States Patent [19]
Kallansrude et al.

[11] Patent Number: 5,165,838
[45] Date of Patent: Nov. 24, 1992

[54] VEHICLE FOR TRANSPORTING LOADS

[75] Inventors: David K. Kallansrude, Huntsville; William C. Aiken, Toney; Dan P. Deitz, Hillsboro; William D. Powelson, Madison, all of Ala.

[73] Assignee: Teledyne Industries, Inc., Los Angeles, Calif.

[21] Appl. No.: 787,078

[22] Filed: Nov. 4, 1991

Related U.S. Application Data

[62] Division of Ser. No. 578,507, Sep. 6, 1990, Pat. No. 5,110,153.

[51] Int. Cl.⁵ .................................. B60P 1/34
[52] U.S. Cl. .................................. 414/471; 5/611; 198/782; 254/2 R; 254/124; 414/346; 414/347; 414/491; 414/495; 414/523; 414/533; 414/535
[58] Field of Search ........... 414/523, 471, 495, 589, 414/590, 522, 345–347, 529–536, 504, 508, 491, 469; 5/610, 611, 601; 254/122, 124, 93 R, 2 R, 3 R, 3 B, 3 C; 198/782, 861.4, 861.5, 315, 317, 318, 316.1; 244/137.1

[56] References Cited

U.S. PATENT DOCUMENTS

| | | | |
|---|---|---|---|
| 943,827 | 12/1909 | Hennessy | 5/611 X |
| 1,452,449 | 4/1923 | Thouviot | 254/3 R |
| 3,259,255 | 7/1966 | Cresci | 414/590 |
| 3,319,932 | 5/1967 | Szczepanik | 254/9 C |
| 3,435,969 | 4/1969 | McCartney et al. | 414/536 |
| 3,489,300 | 1/1970 | McCartney et al. | 414/351 |
| 3,589,490 | 6/1971 | Walkhoff et al. | 193/35 R |
| 3,612,312 | 10/1971 | Berhrmann | 414/786 |
| 3,743,044 | 7/1973 | Scheele | 180/24 |
| 3,854,610 | 12/1974 | Carder | 414/346 X |
| 3,944,277 | 3/1976 | Cyphert | 296/68 |
| 4,250,975 | 2/1981 | Cobb et al. | 180/89.13 |
| 4,799,848 | 1/1989 | Buckley | 414/495 X |
| 4,854,805 | 8/1989 | Althoff et al. | 414/495 |
| 4,907,935 | 3/1990 | Mankey | 414/495 |
| 4,927,127 | 5/1990 | Lock | 5/611 |
| 4,978,272 | 12/1990 | Leon | 414/495 |
| 5,056,977 | 10/1991 | May | 414/495 X |

FOREIGN PATENT DOCUMENTS

| | | | |
|---|---|---|---|
| 2926028 | 2/1981 | Fed. Rep. of Germany | 414/495 |
| 3711232 | 10/1987 | Fed. Rep. of Germany | 414/495 |

*Primary Examiner*—David A. Bucci
*Attorney, Agent, or Firm*—Beveridge, DeGrandi & Weilacher

[57] ABSTRACT

A vehicle having a suspension control system that is especially applicable to an aircargo transport loader which is adapted for storage in a cargo hold of an aircraft. The suspension control system utilizes sensors to monitor the clearance between the vehicle and an underlying or overlying surface such as the ramp leading into a cargo hold or the roof of the cargo hold. The sensors relay information concerning clearance to a central control where the necessary suspension adjustments are made to allow the vehicle to avoid a clearance problem once travel is continued after stopping for the suspension adjustment. The system allows for suspension adjustments to be made either automatically or manually. The invention also includes an under deck support system which allows for limited pitch, yaw, roll and side to side adjustments to be made to the deck with respect to the underlying base frame. The invention further includes a cab relocation system which features a hinged deck section which can be varied from a first position where it covers a deck cutout formed to receive the laterally adjustable operator's cab to a second position where the cutout is uncovered. In the first position, the hinged deck section is releasably locked to the cab for added stability and support.

13 Claims, 10 Drawing Sheets

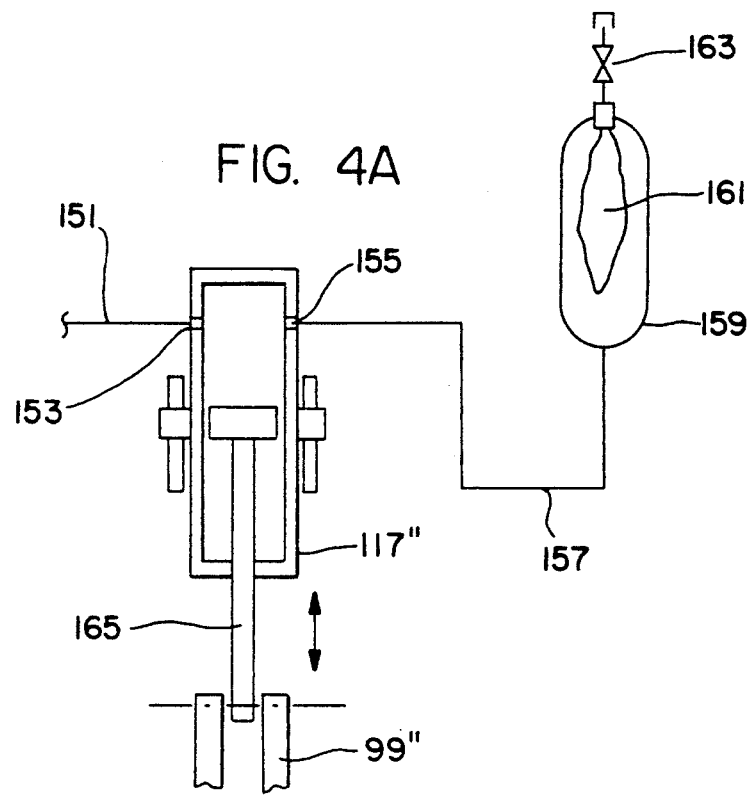
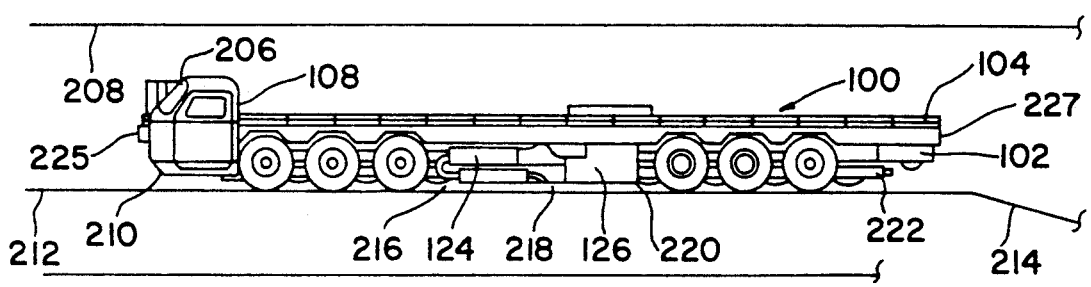

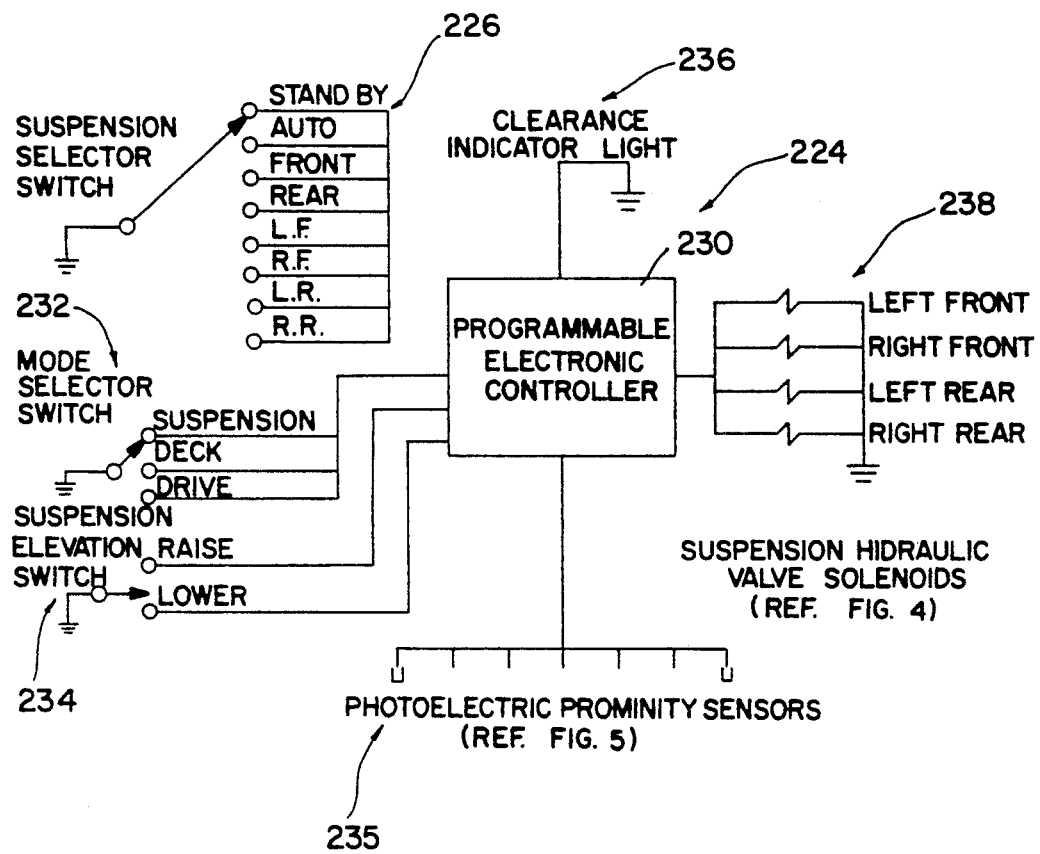
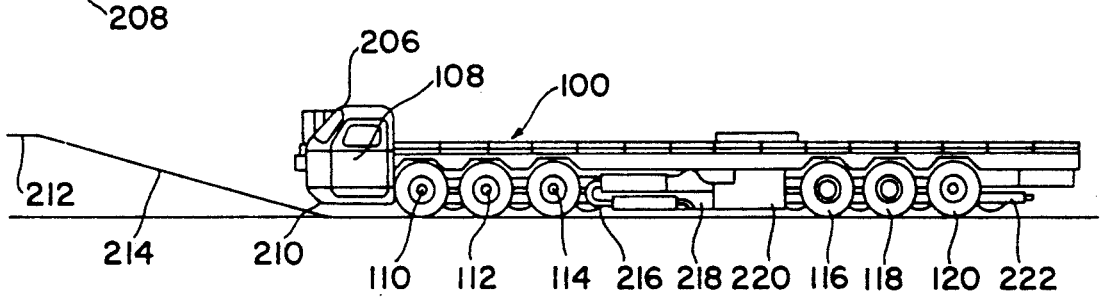

VEHICLE FOR TRANSPORTING LOADS

This is a divisional of co-pending application Ser. No. 07/578,507 filed on Sep. 6, 1990, now U.S. Pat. No. 5,110,153.

BACKGROUND OF THE INVENTION

1. Field of the Invention

This invention relates to a vehicle having systems to facilitate the transportation of loads as well as the vehicle itself. More particularly, the present invention relates to a vehicle having a suspension control system to avoid contact with surfaces, a support system for supporting the load carrying structure while enabling a limited degree of roll, yaw, pitch and side to side shifting, and a stowable operator's cab to lessen the width of the vehicle.

BACKGROUND DISCUSSION (A) Suspension Control

The use of cargo transporters specifically suited for the movement of loads into and out of an airplane as well as storage within the airplane itself are known in the art as exemplified by U.S. Pat. No. 4,907,935. The prior art also recognizes the clearance problem associated with attempting to load such cargo transporters into and out of a cargo aircraft such as a C-130 cargo plane. For example, the above noted patent No. (4,907,935) relies upon hydraulic means to vary the tilt of the transport loader in an attempt to avoid contact between the crest of the ramp surface and the understructure of the loader or contact between the upper surface of the loader and the roof of the plane's cargo hold.

U.S. Pat. Nos. 4,425,978 and 4,570,733 further illustrate rolling cargo containers having means to increase the distance between the wheels and the understructure of the cargo container so as to facilitate loading of the rolling cargo container onto the aircraft.

A common problem associated with the above cited prior art, lies in the heavy reliance on the operator to make the appropriate adjustments. In other words, the operator must have sufficient experience and familiarity with the vehicle to know when and to what extent the vehicle should be modified to ensure contact does not occur. Moreover, not only must the operator be experienced, the operator needs also to maintain a continuous watch over the situation. Such requirements on an operator can easily lead to inadvertent collision between an underlying or overlying surface of the cargo aircraft. Also, U.S. Pat. No. 4,907,935 avoids the use of an underlying base frame which, although perhaps providing added clearance in some areas, presents the potential problem of stability especially for higher weight loads.

U.S. Pat. No. 3,513,927 reveals a hydraulic system and motor designed to torsionally adjust wheel settings to accommodate for different terrain. The system relies upon the operator to determine what adjustments are to be made and to manipulate levers in the driver's cab to adjust the wheel setting. Hence, reliance is again placed on the operator's experience and reflexes.

U.S. Pat. No. 4,420,167 reveals a multi-wheel terrain vehicle having a hydraulic system for reducing the tipping movement of the vehicle. The hydraulic system is activated in accordance with level indicators provided by transducers positioned on rotating arms connected to the wheel and a gyro device positioned on the vehicle. This places great reliance on mechanical detection and the detection takes place coincident with the encountering of uneven terrain.

U.S. Pat. No. 4,618,156 features a vertical height control system using vertical height sensors and an inclination sensor to raise or lower the rear or front end of an automobile upon the automobile reaching an inclination such that the operator is placed in a more comfortable position.

U.S. Pat. Nos. 3,003,783; 4,518,169; 4,595,072; 4,770,438; 4,796,911 and 4,861,067 all disclose the use of ultrasonic emitters for detecting road conditions such that an active suspension system can be adjusted to provide the operator with a more comfortable ride. These devices generally harden or soften suspension devices by restricting or opening flow paths forming part of the suspension devices. Thus the devices are not concerned with monitoring clearance between the chassis of the vehicle and an underlying or overlying surface but, rather, with suspension adjustments to increase or decrease the damping ability of the suspension to accommodate the suspension for the handling of the sensed smooth or uneven road surface.

(B) Load Carrying Structure Support

The aforementioned U.S. Pat. No. 4,907,935 illustrates a frame and cargo platform combination elevated by hydraulicly activated linkage arms. Between the cargo platform and frame is positioned a plurality of hydraulic cylinders for tilting or raising the platform with respect to the frame. The platform can also be moved to the left or right with respect to the frame. The hydraulic cylinders are used for making adjustments in the position of the platform with respect to variable aircraft cargo deck positions. The arrangement however does not fulfill the requirements of (1) aligning a vehicle deck structure with respect to an aircraft's cargo hold and providing adequate freedom of movement while maintaining stability during all vehicle impacts including docking impacts and (2) reducing the maintenance requirements especially those concerning hydraulic fluid leakage.

U.S. Pat. No. 3,319,932 shows a pallet trailer with pivotable and elevatable linking arms. The uppermost end of each set of linking arms is connected to a transversely extending rod received within a spherical bearing assembly which is provided to accommodate platform roll. The driving means for elevating the platform can be disconnected at one or the other end to achieve a longitudinal tipping of the platform. In addition to the complexity and multitude of potentially breakable components, U.S. Pat. No. 3,319,932 fails to provide a desirable degree of freedom of movement while maintaining stability during all functions including docking impacts.

U.S. Pat. No. 3,743,044 illustrates a cargo aircraft having a suspension system for controlling vertical disposition as well as the roll and pitch of a supporting bed. The system features the use of a plurality of ball and socket connections. Similarly, U.S. Pat. No. 3,612,312 utilizes a hydraulic system in association with a ball and socket connection to achieve tilting of heavy structures such as prefabricated ship sections. These systems fail to provide the desired degree of freedom while still maintaining a relatively maintenance free system.

(C) Operator Cab Relocation

The cargo transporter noted in the aforementioned U.S. Pat. No. 4,907,935 illustrates an operator's cab which can be pivoted to the front of the transporter in order to reduce the width of the transporter in an aircraft hold. The pivoting of the cab, although reducing the width of the transporter, increases the length of the transporter thus reducing potential storage space in the aircraft cargo hold.

U.S. Pat. No. 3,489,300 illustrates a cargo handling apparatus which includes a driver's station moveable in a transverse direction into and out of a cutout formed in the load carrying bed. When the driver's station is positioned out of the cutout an opening is left wherein no conveyance rolling means is provided. This opening is problematic in the sense that shifting cargo might catch an edge of the cutout or cargo units might actually fall off through the cutout during transportation. Furthermore, the driver station moving means is positioned along the undersurface of the main support frame so as to reduce the clearance height between the main support frame and the ground below.

U.S. Pat. Nos. 3,944,277 and 4,250,975 further illustrate transverse driver station movement in the context of an automobile and a mining machine. U.S. Pat. No. 3,944,277 relies on an understation connection and an understation transverse force means location which lead to the above noted problems with clearance. U.S. Pat. No. 4,250,975 positions the transverse force means at a position behind the cab so as to require long hydraulic extension.

SUMMARY OF THE INVENTION

In General

The present invention relates to a vehicle for transporting loads such as an aircraft cargo loader. The present invention is also concerned with systems usable with such a vehicle to enhance user operability, support capability, and stowage capability.

(A) Suspension Control System

A first aspect of the invention is directed at a vehicle having a suspension control system which enables the operator to manually adjust or, alternatively, provides for automatic adjustment following an indication that adjustment is to proceed. The suspension system monitors the environment surrounding the transporter vehicle in order to detect surfaces which would come in cont˜ct with the vehicle if the vehicle were to continue movement in the same direction.

The suspension control system is especially suited for use with an aircraft cargo loader which can be easily adapted for stowage and transportation within an aircraft such as a C-5, C-17 and C-141 cargo airplane. Such aircraft commonly have a relatively steep ramped surface with a crest that can easily contact the understructure of an elongated aircraft loader. Furthermore, cargo holds in cargo aircraft often have limited clearance between the upper surface of the cargo hold and the aircraft loader which can lead to collisions between the two, especially when the transporter ascends the ramp and first enters the cargo hold.

The suspension control system is particularly suited for use with a multi axle vehicle (e.g. 6) having articulating axles; that is, each axle is capable of independently moving up and down without effecting any of the other axles. The suspension control system includes sensor means positioned on the vehicle so as to detect surfaces which are a predetermined distance away from the sensor means. Preferably the sensor means comprises a plurality of photoelectric sensors positioned in areas on the vehicle most susceptible to clearance problems. For example, below the forward and rearward edges of the base frame of the vehicle, serially spaced below the midsection of the base frame, and on the forward top portion of the operators cab or any other structure of the vehicle subject to collision with an overlying surface such as the roof of the cargo hold. Additional sensors can also be provided on the front and/or rear of the vehicle to detect spacing from surfaces during backing and forward movement of the vehicle. The sensors are also adjustable for use in different situations. The range or distance of each sensor can be made different for some or all of the sensors in accordance with their respective position on the vehicle. For instance, a sensor on a lower body portion of the base frame and a sensor on a higher body portion of the base frame could be provided with different detection ranges to ensure adequate clearance.

The suspension control system further includes control means in communication with the sensor means for analyzing signals received from the sensor means. The sensor means includes means for signalling when a surface is detected to be within a predetermined range from the sensor means.

The control means features means for outputting adjustment signals following receipt of detection signals from the sensor means. The adjustment signals activate the vehicle's suspension adjustment means such that the vehicle's suspension devices are modified so as to provide the necessary degree of clearance between the vehicle and the detected surface.

In a preferred embodiment, the suspension adjustment is accomplished automatically based on the results of a preprogrammed algorithm or, alternatively, the operator manually raises or lowers the various suspension devices which, when taken together, constitute the vehicles suspension system.

The suspension control system also includes one or more clearance indicators, such as a light indicator, which can be is activated following receipt of a signal to the control means that a surface is a predetermined distance away from the sensor means. When in the automatic mode, the clearance indicator directs the operator to brake the vehicle such that the vehicle is stopped during the automatic adjustment of the suspension system. Once the appropriate adjustment is made, the sensor stops issuing a detection signal and the clearance indicator is deactivated so that the light shuts off and the operator knows it is safe to continue movement of the vehicle until the light is again activated.

The clearance indicator provides the same or a similar function in the manual mode. Upon the clearance indicator being activated, the operator stops the vehicle and directs adjustment signals towards the appropriate suspension devices (e.g. left front, left rear, right front, right rear or any combination thereof). When the vehicle has been properly adjusted the clearance indicator shuts off indicating that it is safe to continue travel. The invention also contemplates the use of a plurality of clearance indicators to help the operator by indicating which section of the vehicle is close to the detected surface. In this way, the operator can easily adjust manually the appropriate suspension device or devices.

To adjust manually, the operator can utilize a switching board which includes the choice of raising or lowering as well as the ability to set a switch designating which of the suspension devices is to be activated in accordance with the raise or lower choice.

The suspension system preferably features a pair of hydraulic cylinders per each axle and wheel set. An additional pair of suspension devices is added to the axle of the driving wheels in a preferred embodiment. The adjustment of the suspension devices can be done individually or in a group.

The suspension adjustment means in communication with the control means has a plurality of fluid communication lines leading to a plurality of suspension devices which can include hydraulic cylinders. The fluid communication lines can be gas or liquid lines wherein the gas or liquid is directed through the system with control valves. In a preferred embodiment, the suspension system height is controlled by a first control valve (or similarly functioning device) which can be associated with each suspension device individually or with a group of suspension devices. The first control valve is utilized to set a suspension height sufficient to handle normal road obstacles and grade variations.

To negotiate severe ramp angles and to avoid clearance problems, the normal, first control valve is disabled in favor of a second type of control valve capable of adjusting the suspension level to a point between a larger height range extending from a maximum to a minimum height. The operation of the fluid communicator system and associated valve means is preferably carried out with an electrical control system which is itself part of the aforementioned control means.

The control means of the suspension control system also preferably includes a three-way mode selector switch enabling the operator to choose between a "suspension", "deck" or "drive" mode. The drive mode is the setting used for normal operation as referred to above. The "deck" setting controls hydraulic devices associated with the deck support which will be discussed in greater detail below. To enable the suspension system to operate between the aforementioned "maximum" and "minimum" suspension levels, the mode selection switch is set at the "suspension" setting. When the mode selection switch is in the suspension mode, the suspension device selector and the suspension raise-/lower switches are made operational. Furthermore, the suspension device selector allows the operator to choose a stand-by position, an automatic position, a front position, a rear position, or a left front (L.F.), right front (R.F.), a left rear (L.R.), and a right rear (R.R.) position.

(B) LOAD CARRYING SUPPORT STRUCTURE

Load carrying transport vehicles, such as an aircraft cargo transport loader, often include an adjustable upper deck or platform upon which the cargo to be transported is loaded. When performing loading and unloading functions with an adjustable deck load carrying transport vehicle, the operator is required to raise the deck to the sill height of the aircraft, truck, dock or another loading vehicle. The operator is also required to simultaneously or individually make adjustments for misalignments by rotating or shifting the deck in the roll, pitch, yaw and side-to-side direction without interference between components or loss of stability. The loader needs also to be able to withstand repeated impacts with a permanent loading dock at speeds which commonly are around 2.5 mph.

The present invention provides an under-deck support system which allows for pitch, roll, yaw and side-shift manipulation of the deck with respect to a lower support structure of the vehicle. The under-deck support system of the present invention is also capable of providing adequate freedom of movement while maintaining stability during all functions including deck impacts. In addition, the under-deck support system avoids the problems of deck sagging and drifting which can occur in prior art systems relying upon a hard center pivot mount with vertical cylinders on each side which always require oil pressure support. Such prior art systems suffer from the drawback of being more prone to leakage and the resulting misalignment caused by that leakage.

The under-deck support structure of the present invention features securement means connecting the deck of the vehicle to the lower support structure of the vehicle. The securement means includes a plurality of slide block housings attached to the undersurface of the deck. In a preferred embodiment, there are two pairs of slide block housings, one pair transversely spaced at one end of the deck and the other pair transversely spaced at the opposite end.

A slide block is positioned in each of the slide block housings and is able to slide to a limited extent therein. Preferably, the block is able to slide for about 3 inches to each side of a block centered in the housing. The use of a lubricant or low friction bearing surfaces may be relied upon to facilitate and smooth the shifting action of the blocks within the housings.

Each of the slide block housings are attached with a link member. The link members each have a ball end received within a ball socket formed in the slide blocks. Preferably the link members include a hydraulic cylinder which can be extended or retracted to assist in providing the desired vehicle pitch or roll position.

The under-deck support structure also includes attachment means for attaching the link members to the lower support structure of the vehicle. The attachment means includes roll cylinder blocks each having a recess formed therein for receiving the free end of a respective one of said link members. A main lift assembly forms part of the attachment means and, when utilizing two pairs of slide block housings with each pair longitudinally spaced at opposite ends of the deck and each member of the pair being transversely spaced from the other, the main lift comprises right forward, left forward, right aft and left aft arm means. Each arm means includes a lower and upper lift arm member with each pivotably attached to the other and the lower pivotably attached to the lower support structure of the vehicle and the upper attached to the deck. The upper lift arm of each arm means has an end attached, in trunnion fashion, to one of the roll cylinder blocks which are in turn connected with the link members.

Hydraulic cylinders are attached to the upper arm member of each arm means so as to enable independent manipulation of the four arm means in a manner which raises and lowers the deck in relation to the lower support structure of the vehicle.

The attachment means further includes a first transverse connecting member extending between a transversely spaced pair of roll cylinder blocks located at one end of the deck structure. In addition, a second transverse connecting member extends between the other pair of roll cylinder blocks positioned at the other end of the deck. Preferably each of the upper lift arm members of the four arm means has a pair of flanges spaced on opposite sides of a roll cylinder block positioned there between. Extending inwardly from the two interior surfaces of the pair of flanges to the sides of the roll cylinder block are the trunnion mount members which enable the roll cylinder block to rotate between the pair of flanges. The transverse connecting member extends between, and is connected to, the innermost flange of each of the pairs of flanges.

The securement means securing the deck to the lower support structure of the vehicle can also include a pair of beam boxes extending downwardly off the lower surface of the deck. Each of the pair of beam boxes is positioned at opposite ends of the deck and has two open sides such that the transverse connecting members can pass through the beam boxes and be covered by the remaining sides of the beam boxes. To provide an added damping function, the transverse connecting members include a layer of elastic material positioned so as to come in contact with a beam box any time the transverse connecting member sufficiently deviates from a horizontal plane. The transverse connecting members, in combination with the surrounding beam boxes, are especially suited for providing added structural stability during vehicle impacts.

A limited and stable roll of the deck is made possible by extending two of the four hydraulic cylinders that are positioned on a common side of the vehicle and allowing the opposite side of the deck to rotate about the ball and socket connections existing between the pair of link members and the slide blocks on the opposite side of the deck. The freedom of rotation of the ball joints and the side shifting of the slide blocks helps to compensate for the change in horizontal difference of the two opposite sides of the deck. In addition, fine adjustments can be made by extending or retracting the hydraulic cylinders forming a component of the link members. An advantage of the present invention over the prior art systems is that the upper support structure is allowed to bottom out through the link members to the upper ends of the main lift assembly (i.e. the arm means and attached hydraulics) when the deck is in the null roll position. This arrangement of the present invention thus prevents sagging and drifting of the deck which was common among the prior art systems especially those prior art systems using a hard center pivot mount with vertical cylinders on either side of the pivot. Such prior art systems would have one cylinder pushing up while the other cylinder pulled down to rotate the deck about the central pivot point. However, because the cylinder pistons spaced from the central pivot point are constantly supported by oil pressure, any hydraulic leakage or unbalanced loading results in an undesired rotation unless a complex active level sensing system is used to make corrections. Further, such leveling systems would not correct for rotations during idle periods on loaded loaders.

A pitch motion of the deck of the present invention is made possible by lowering or raising one a pair of arm means located at opposite ends of the vehicle and forming part of the main lift assembly. Alternatively, the link members can be extended or retracted to provide further manipulation in the deck's position.

The aforementioned control system with its mode selection switch features a "deck" mode which enables the operator to adjust the height of the four hydraulic cylinders of the main-lift-assembly as well as the hydraulic link members.

(C) OPERATOR'S CAB RELOCATION

The present invention includes an operator's cab relocation system which transfers the cab laterally into a pocket formed in the vehicle's cargo supporting platform. In the preferred embodiment, wherein the vehicle is an aircraft loader, the upper supporting platform of the vehicle is an elevatable deck having conveying means. The deck has a recess or cutout formed therein into which the cab can be inserted. The deck includes a deck section adapted for placement in a first position wherein the deck section covers the cutout and is essentially planar with the remainder of the deck structure such that a continous conveyance surface is provided. The deck section can also be placed in a stowage position which leaves room for the cab to be placed in the deck cutout.

The cab relocation system also includes moving means such as a hydraulic cylinder which moves the deck section from the first position to the second stowage position which leaves the cutout uncovered such that the cab can be transferred therein. The cab is supported by supporting means and is laterally transferable by transverse motion means such as a hydraulic cylinder attached to the side of the cab. The supporting means is preferably a cantilever beam slideably received within a channel guide attached to the lower support structure or base frame of the vehicle.

The deck section is preferably pivotably attached at one edge to the deck cutout. The moving means, which moves the deck section from its first to second position or vice versa, is preferably a pivotably mounted hydraulic cylinder. The pivotably mounted cylinder is attached to a lever extension of the deck section which allows the deck section to pivot about its pivotable attachment with the deck. To enhance the stability and to assist in supporting the cab, the deck section is provided with releasable locking means at its free end close to the side edge of the deck which can be secured to the cab. The controls for operating the moving means and transverse motion means can be provided in the operator's cab. Further, a suitable releasable locking means can include a pair of bolts which an operator can quickly and easily remove for quick transference of the cab to a position within or out of the cutout. The present inventions cab relocation system thus provides added support stability and the ability to quickly and easily move the cab into and out of stowage position.

BRIEF DESCRIPTION OF THE PREFERRED EMBODIMENTS

Other advantages and improvements over the prior art will become more apparent from the description to follow in which:

FIG. 4A shows a schematic view of a suspension device of the present invention;

FIG. 5 shows a side view of that which is shown in FIG. 1 and the positioning of the sensors thereon;

FIG. 6 shows a schematic view of the suspension control system;

FIGS. 7A to 7H shows the sequential steps of a vehicle being placed in storage in an aircraft's cargo hold the suspension control system and the use of;

Figure 8A:
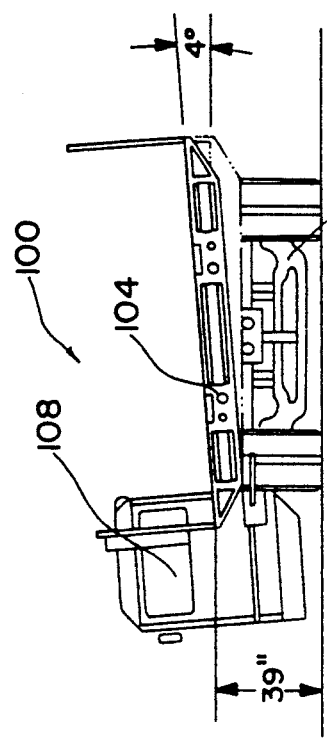
Figure 8B:
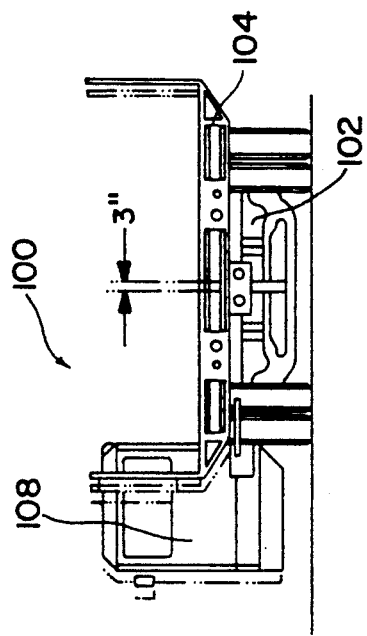
Figure 8C:
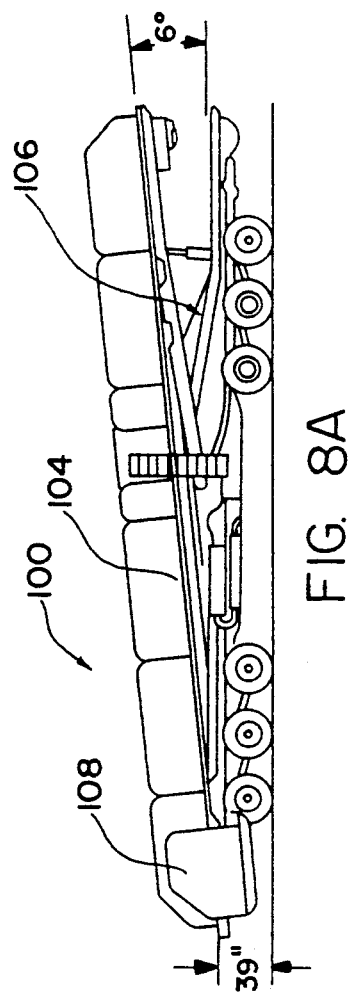
Figure 8D:
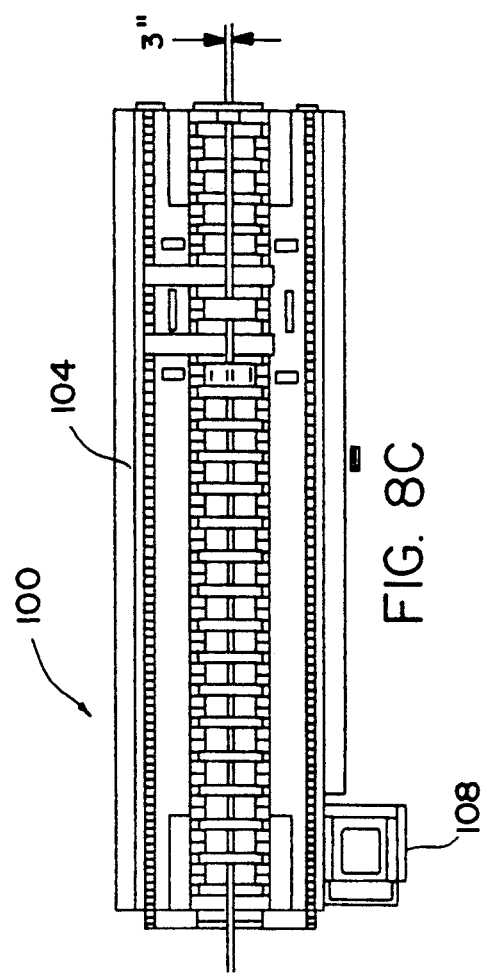
Figure 9:
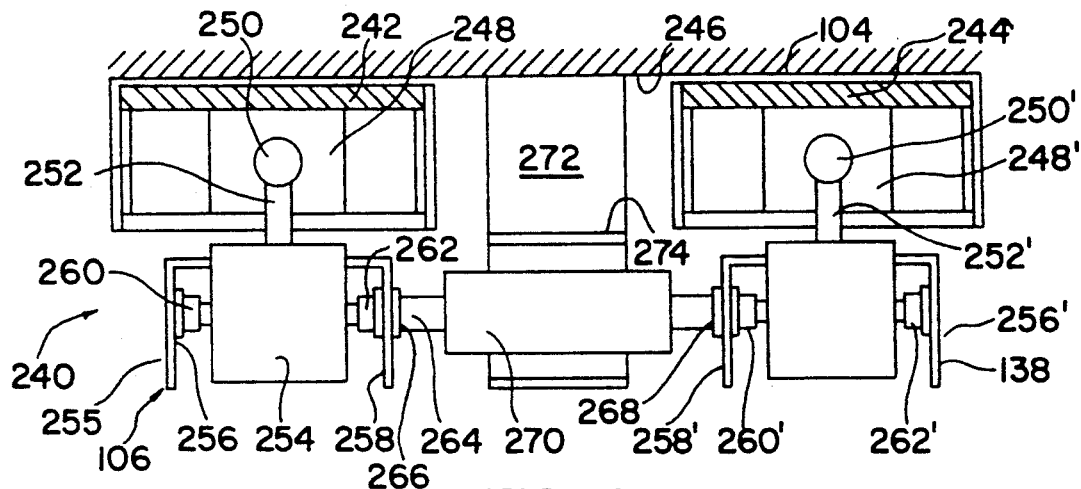
Figure 10:
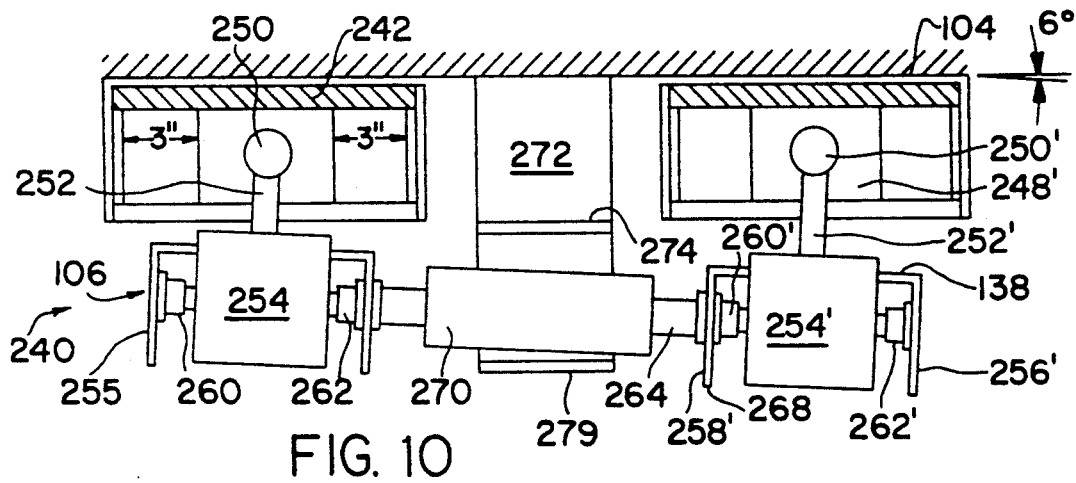
Figure 11:
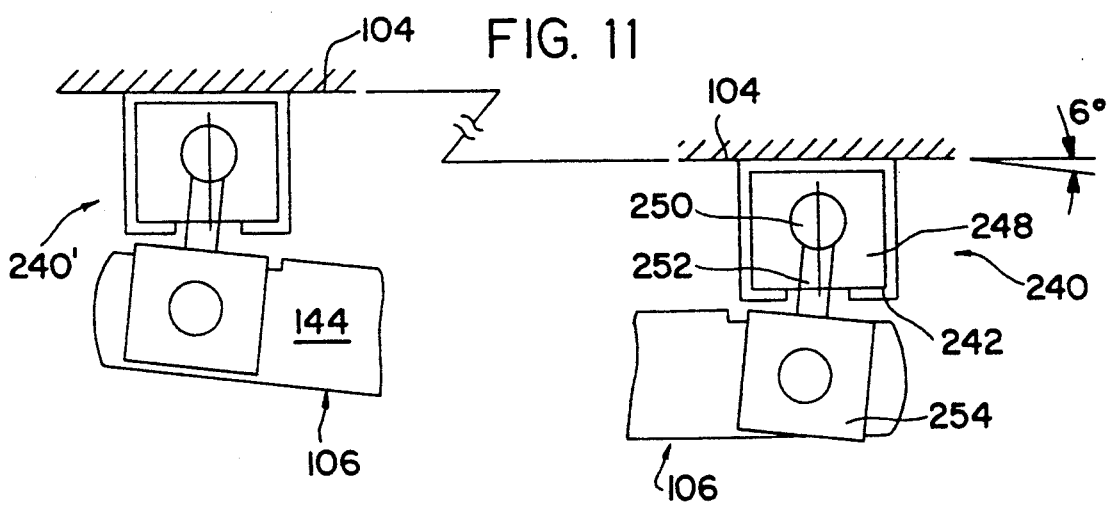
Figure 12:
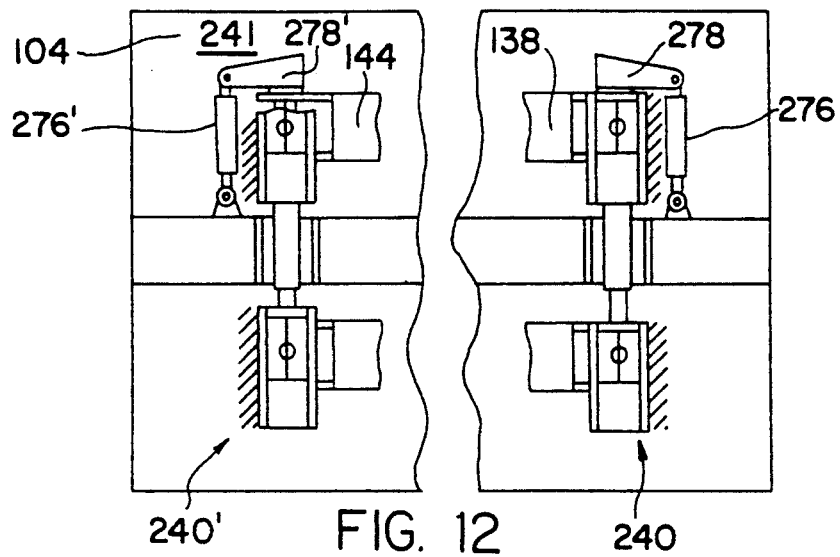
Figure 13:
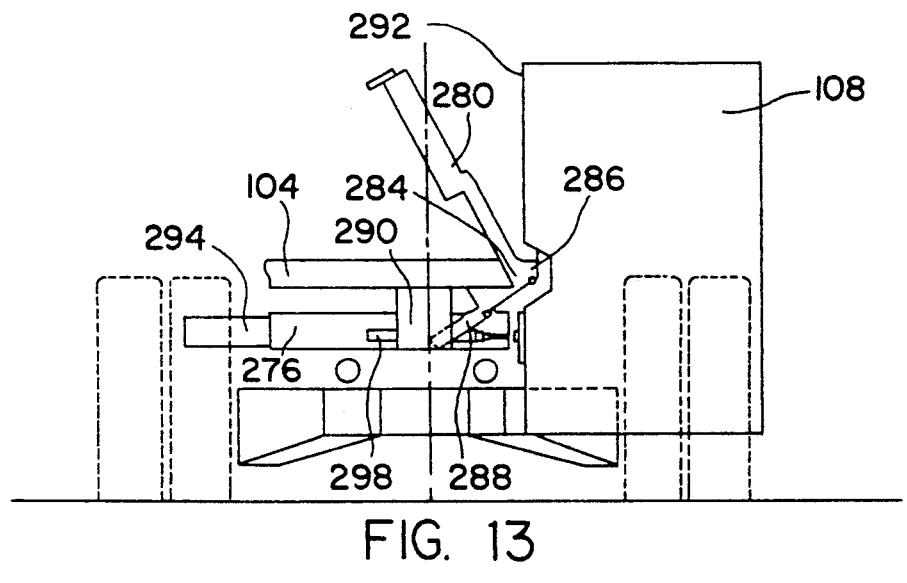
Figure 14:
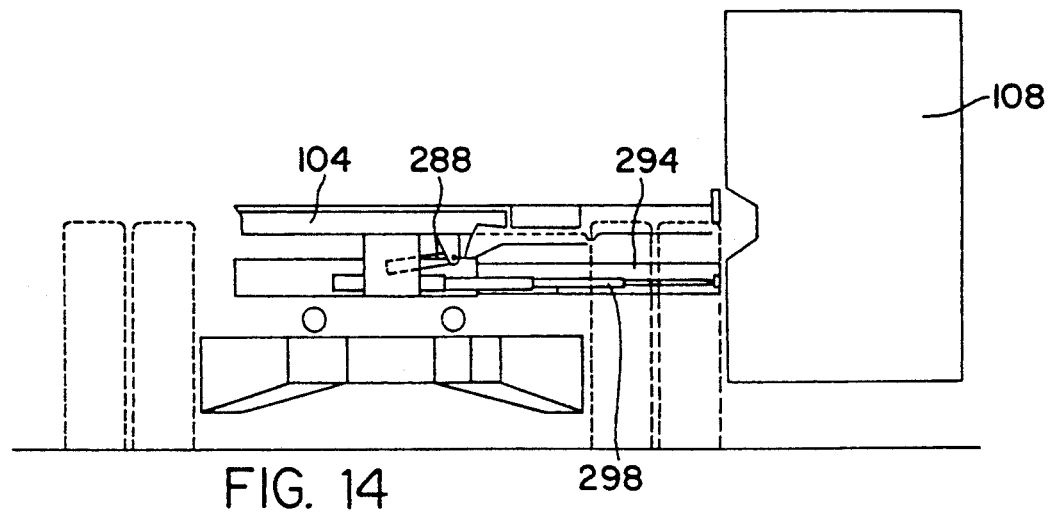

FIG. 8A shows the vehicle's pitch adjustment;
FIG. 8B shows the vehicle's roll adjustment;
FIG. 8C shows the vehicle's yaw adjustment;
FIG. 8D shows the vehicle's side shift adjustment;
FIG. 9 shows a cross-sectional end view of the under deck support structure when the vehicle is in normal position;
FIG. 10 shows a cross-sectional end view of the arrangement of the under deck support structure when the vehicle is in roll adjustment position;
FIG. 11 shows, in cut away fashion, a cross-sectional side view of the deck support structure in a pitch adjustment position.
FIG. 12 shows, in cut away fashion, a cross-sectional bottom view of the under deck support structure which provides for yaw and side shift adjustments;
FIG. 13 shows the transversely moveable cab in a stowage position;
FIG. 14 shows the transversely moveable cab in an extended position.

DETAILED DESCRIPTION OF THE PREFERRED EMBODIMENTS

The following detailed description of the present invention is directed at the preferred embodiment of an air cargo transportation vehicle. However, the systems discussed below which comprise the present invention are adaptable for use with other types of vehicles having similar requirements as that of the air cargo transport loader described below.

Figure 1:
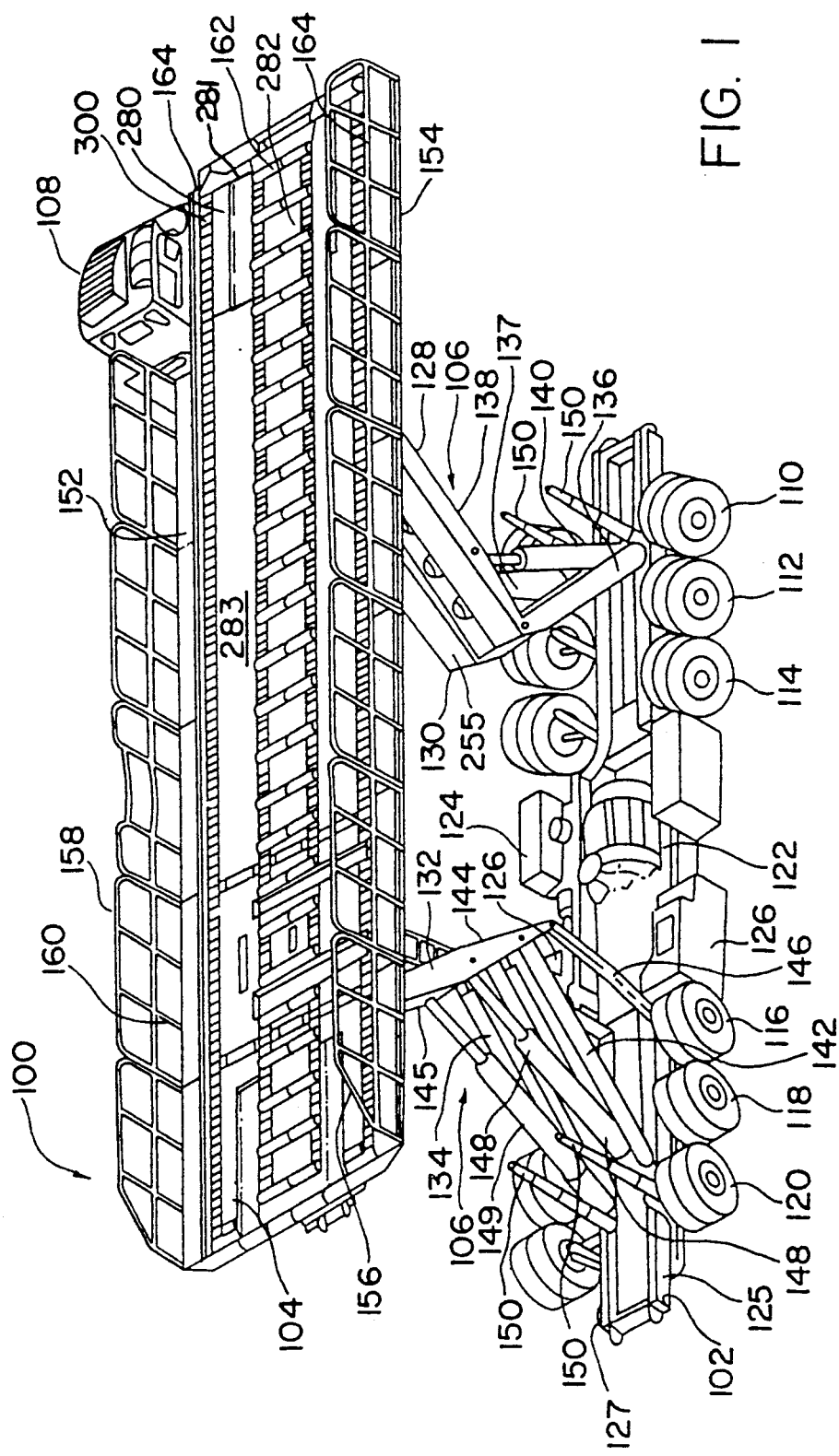
FIG. 1 shows a preferred vehicle embodiment of the present invention in perspective.

FIG. 1 shows a perspective view of air cargo transport loader 100 having base frame or under structure 102, deck 104, and main lift assembly 106 positioned therebetween. At the left, front end of deck 104 is positioned operator's cab 108. Base frame 102 is supported by suspension means attached to ground engaging means with the latter, in this embodiment, being six wheel-axle sets 110, 112, 114, 116, 118, and 120. Wheel-axle sets 110, 112 and 114 are steerable wheel-axle sets with steering being accomplished in any of the conventional ways commonly used for multi-axle vehicles.

Towards the center of base frame 102 are mounted engine 122, battery compartment 124, and fuel tanks 126 (one shown). Wheel-axle sets 116 and 118 represent the driving wheel-axle sets and thus are drivingly connected with driving means which are discussed in greater detail below. The rearward wheel-axle set 120 can be disengaged from being a load carrying wheel-axle set so as to form a trailing, non-loaded wheel axle set. Such disengagement helps improve vehicle traction as the vehicle travels up a steep incline on the two remaining driving wheel-axle sets by transferring the load previously carried by wheel-axle set 120 unto wheel-axle sets 116 and 118 to improve the traction of the two driving wheel-axle sets 116 and 118. This principle is illustrated in FIG. 7 wherein axle 120 is shown as not contacting the ramp.

Figure 2:
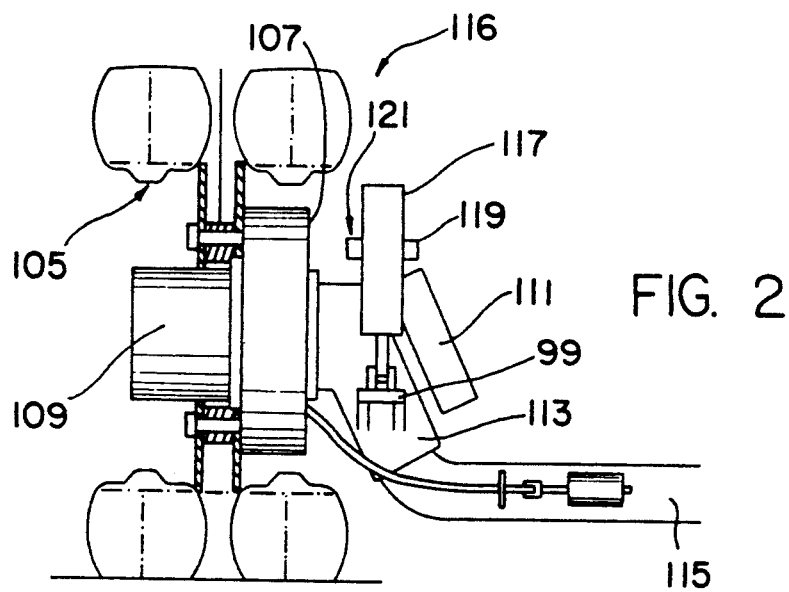
FIG. 2 shows a cut away view of a driving wheel-set of the vehicle.

FIG. 2 illustrates one end of driving wheel-axle set 116 having wheel assembly 105, brake drum 107 and planetary hub 109. Planetary hub 109 is in driving communication with hydrostatic drive motor 111 which is individually mounted on axle support 113. Axle support 113 is attached at one end to axle 115. Hydraulic cylinder 117 is pivotably connect to pivot support 99 formed integral with axle support 113. In a preferred embodiment an additional hydraulic cylinder would be placed on the opposite side of drive motor 111 to enhance the suspension characteristics of the vehicle. Hence a total of four hydraulic cylinders, two at each end of axle 115, would be provided for driving wheel-axle sets 116 and 118. FIG. 2 also shows hydraulic cylinder 117 with trunnion mounts 119, 121.

Figure 3A:
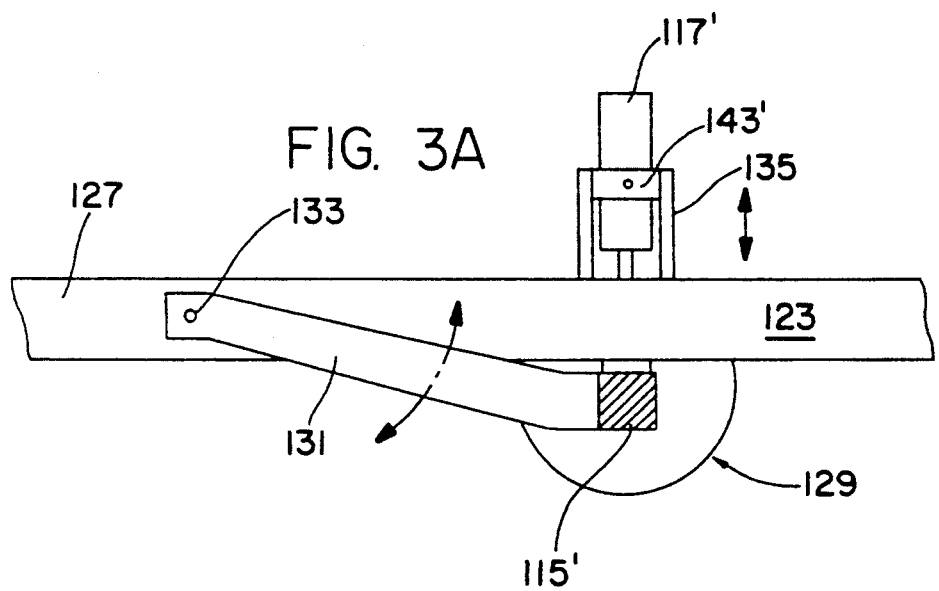
FIG. 3A shows a cut-away side view of the articulating arrangement of a wheel-axle set.

FIG. 3A shows the interior surface 123 of side beam 127 shown in FIG. 1. The left side wheel assembly 129 of wheel-axle set 110 (FIG. 1) is shown to be positioned on the outer side of beam 127. FIG. 3A further shows axle trailing link 131 fixed at one end to axle 115' and at its other end to side beam 127 with pivot attachment 133. FIG. 3A also shows hydraulic cylinder 117' fixed in trunnion fashion to support stand 135 which is attached to side beam 127.

Axle 115' is thus connected to side beam 127 beam by at least one hydraulic cylinder 117' for control of the lift height of the base frame relative to the axle.

Axle 115' is also connected to the base frame 102 by trailing link connection 131 for transferring braking acceleration and steering forces. The base frame is raised or lowered from the axles as hydraulic fluid is added or removed from the hydraulic cylinders. As noted above, there can be one or more hydraulic cylinders at each end of each axle depending on whether the axle is a steering axle (one pair used) or a drive axle (two pairs used).

Figure 3B:
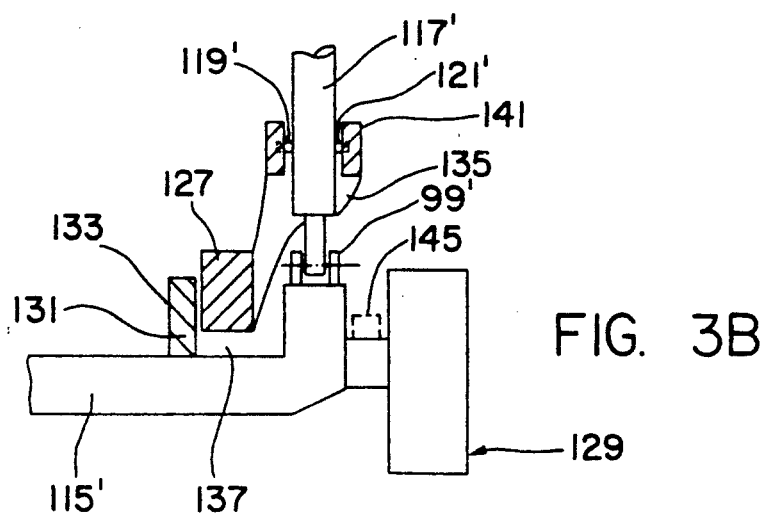
FIG. 3B shows a schematic, cut-away view of the suspension device in attachment with an articulating axle.

FIG. 3B shows, in end view, wheel assembly 129 interconnected with axle 115'. FIG. 3B further illustrates trailing link 131 pivotably affixed at one of its ends to side beam 127 through pivot attachment 133. Support stand 135 is fixed at one end to side beam 127 and forms trunnion mounts 141 and 143 for receipt of pivot supports 119' and 121'. Hydraulic cylinder 117' is connected to axle 115' at cylinder pivot support 99'. Clearance space 137 is provided between side beam 127 and axle 115'. When the loader is in a fully loaded position side beam 127 rests on axle 115'. When axle 115' is an axle in one of the steerable wheel-axle sets, reference 145 represents the location where the kingpin of the steering mechanism (not shown) would be located. When axle 115' is an axle in one of the driving wheel-axle sets, reference 145 represents the location where the hydrostatic wheel motor is mounted as shown in FIG. 2.

As shown in FIG. 1, main lift assembly 106 comprises right forward arm means 128, left forward arm means 130, right aft arm means 132 and left aft arm means 134. Right forward arm means 128 includes lower lift arm member 136 and upper lift arm member 138. Lower lift arm member 136 is pivotably connected at one end to base frame 102 while its other end is pivotably connected to an end of upper lift arm member 138. Right forward activator 140 is pivotably connected at one end either to base frame 102 or the end of arm member 136 or both. Forward activator 140 is also pivotably connected at its other end to upper lift arm member 138 such that the two arm members can either be folded on top of each other or partially or completely straightened. A similar arrangement exists with respect to left forward arm means 130 having activator 137. The end of each of the upper arm members is connected with the deck in a manner described in greater detail below. The right and left forward arm means 128 and 130 thus make it possible to lift the forward end of deck 104 either horizontally with both forward activators extended equally or in a tilted fashion with one side of the forward end of deck 102 being tilted with respect to the other side, by unequal extension of activators 137 and 140.

Referring still to FIG. 1, right aft arm means 132 includes a lower lift arm 142 pivotably connected to base frame 102. The opposite end of lift arm 142 is pivotably connected to upper lift arm 144 at a point between the two ends of upper lift arm 144. Linkage member 146, which is pivotably connected to base frame 102 at one end, has another end pivotably secured to one end of upper lift arm 144. The other end of lift arm 144 is connected to deck 104 in a manner explained in greater detail below. Right rearward activator 148 is connected between the upper and lower lift arms so as to allow for extension and retraction of right arm means 132. The left aft arm means 134 has the same set up as that of the right aft arm means with an upper lift arm 145, a lower lift arm 147, a linkage member (not shown), and a left aft activator 149.

A plurality of telescoping starting rams 150 can also be provided to assist in the suspension of loads on the cargo deck 104.

Operator cab 108 is shown in FIG. 1 to be positioned in the front end of the left side of deck 104. Cat walks 152 and 154 are provided on opposite sides of deck 104. Hand railings 156 and 158 are also provided on opposite sides of deck 104. The upper, essentially planar, surface of deck 104 includes a plurality of idler rollers 160 and powered rollers 162. Guide rails 164 are also provided to each side of the conveying portion of deck 104 to guide cargo traveling thereover.

The arrangement shown in FIG. 1 provides an aircraft cargo loader having a carrying capacity of 60,000 lbs and a deck height adjustment capability of from 39 to 220 inches.

Figure 4:
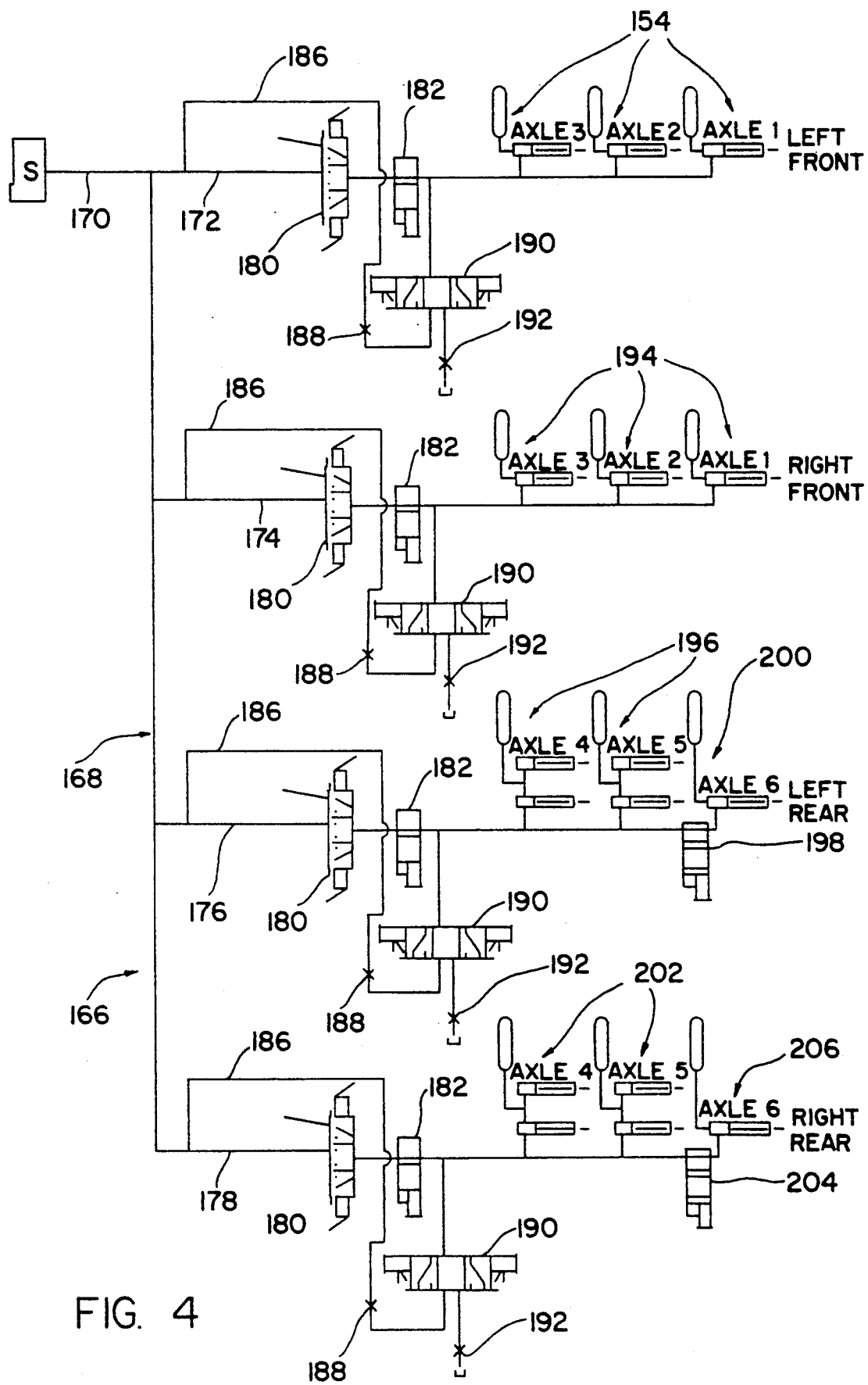
FIG. 4 shows a schematic of the suspension adjustment system.

FIG. 4 shows a schematic layout of the vehicle suspension adjustment means 166 which includes fluid communicator system 168. Fluid originating from fluid source S travels throughout fluid communication system 168. Fluid communication system 168 includes main source line 170 which branches into first fluid conduit 172, second fluid conduit 174, third fluid conduit 176, and fourth fluid conduit 178. Positioned in line with each of fluid conduits 172 to 178 is one normal range valve member 180. Downstream from each of the normal range valve members 180 is positioned a disabling valve member 182.

First fluid conduit line 172 extends to each of the suspension devices 184 associated with the left ends of each of the axles in the forwardmost group of wheel-axle sets 110, 112 and 114 (FIG. 1). First fluid conduit 172, as well as the other fluid conduits 174, 176 and 178, include a branch line 186 which bypasses normal range valve members 180 and disabling valve members 182 positioned on the fluid conduit lines. Each branch line 186 includes a first flow restrictor 188 and, downstream from flow restrictor 188, a maximum-minimum height suspension control valve 190. Flow restrictors 188 control the amount of fluid entering control valves 190 while a second flow restrictor 192 operates to control the amount of fluid exiting control valves 190. Downstream from control valves 190, branch lines 186 return into communication with a respective one of fluid communication lines 172, 174, 176, and 178.

As noted above, fluid conduit line 172 communicates with suspension devices 184 connected to the left ends of each of the axles in the forward most group of wheel-axle sets 110, 112, and 114. Fluid communication line 174, on the other hand, communicates with suspension devices 194 which are connected to the right end of each of the axles in the forwardmost group of wheel-axle sets. Fluid conduit line 176 communicates with the double suspension arrangement 196 positioned on the left axle ends of the forward two wheel-axle sets (116, 118) of the aft group of wheel-axle sets (116, 118 and 120). In line with fluid conduit 176 is an uncoupling valve member 198. Uncoupling valve member is positioned so as to regulate the flow to suspension device 200 positioned at the left axle end of the rearwardmost wheel-axle set 120. The right aft group of wheel-axle sets 116, 118 and 120 are arranged with double suspension arrangement 202, uncoupling valve member 204, and suspension device 206 which controls the load carried by the right axle end of rearwardmost wheel-axle set 120. With this arrangement, when a steep ramp is encountered and the rearwardmost wheel-axle set is to be a non-driving, trailing wheel axle set, flow valves 198 and 204 can be set so as to block the entry of fluid from the fluid source and to bleed all fluid pressure from suspension devices 200 and 206 so as to make rearwardmost wheel-axle set 120 a non-loaded carrying axle, thereby transferring its load unto wheel-axle sets 116 and 118 to improve traction on steep ramp surfaces.

FIG. 4 illustrates that each of the valves discussed can include an electric solenoids. Also, in a preferred embodiment, the suspension adjustment system is an air-over-hydraulic system. Alternately, the suspension devices can also be air driven or a complete hydraulic system or a hydraulic-over-air system may be relied upon.

FIG. 4A illustrates an air-over-hydraulic suspension system which includes hydraulic cylinder 117" pivotably connected to support 99". Hydraulic fluid communication line 151 is attached to fluid inlet 153 of cylinder 117". Outlet 155 is provided in cylinder 117" and fluid communication line 157 is connected with outlet 155. Hydraulic accumulator 159 is in communication with communication line 157. Contained within accumulator 159 is expandable air bladder 161 formed of an oil-compatible material. Air valve 163 allows bladder 161 to be set at a predetermined pressure. Thus, hydraulic fluid is found in the hydraulic cylinder 117", the accumulator 159 as well as fluid communication lines 151 and 157. Air bladder 161 is prefilled with air to a pressure commensurate with a desired spring rate for the cargo loader or vehicle.

During vehicle operation, the volume of bladder 161 fluctuates as piston 165 of cylinder 117" moves up or down causing fluid to be forced into or removed from accumulator 159. Longer lines with small diameters provided higher suspension damping rates. Fluid flow into and out of accumulator 159 absorbs road bumps and road irregularities. Also, the addition of hydraulic fluid into inlet 153 of cylinder 117" results in a raising of the loader's chassis height while the removal of fluid causes a lowering in the loader's chassis height.

FIG. 5 shows a side view of air cargo transport loader 100 with deck 104 in a lowered position. FIG. 5 illustrates the positioning of sensors with respect to vehicle 100. More particularly, FIG. 5 shows sensor 206 positioned on the upper front edge of operator's cab 108 such that the clearance between cab 108 and an overlying surface such as upper roof surface 208 can be monitored. Positioned at the forward, lower front edge of cab 108 is sensor 210 for detecting an underlying surface such as the floor 212 or ramp surface 214 associated with an aircraft cargo hold. Along the undersurface of base frame 102 and/or associated elements, such as fuel tanks 126, battery compartment 124, etc., sensors are also positioned. FIG. 5 reveals the positioning of sensors 216, 218, 220 and 222.

Sensors 225 and 227 are also positioned forward and rearward of the vehicle to assist in monitoring forward and rearward clearance, particularly when approaching an aircraft. Additional sensors can also be provided in order to meet the needs of various surface profiles. Sensors 225 and 227 may be or may not be made, part of the vehicle suspension control system.

The sensors noted above can be positioned in alternate positions as that shown in FIG. 5 with the ultimate objective being to position the sensors in locations where the vehicle is most prone to any clearance problems. For example, rather than sensor 210 being positioned at the forward, lower edge of cab 108 it could be positioned at the forward, lower edge of base frame 102.

The above noted sensors are preferably modulated photoelectric sensors having an adjustable sensor range with the range being adjusted to suit a particular application. For example the range of sensor 206 is preferably about 3 inches, sensor 210 about 3 inches, sensor 216 about 2 inches, sensor 218 about 2 inches, sensor 220 about 2 inches, sensor 222 about 3 inches, sensor 225 about 6 inches and sensor 227 about 6 inches. Other types of sensors are also possible although this photoelectric type sensor is preferred because it does not require a good retroflective target surface and a photoelectric type sensor works well in detecting surfaces despite the presence of fog, dust and other air contaminates.

A suitable proximity sensor for use in the present invention is the Microswitch (Honeywell) MLS 11 series model with specific part number FE-MLS11S-F20A. The sensor operates using 12 V(dc) at 120 milliamps. The sensor has a diffused scanning control which does not require a retroflective target surface. Any target within 2 to 20 inches will return sufficient beam energy for use in the present invention. Preferably, the sensor has a gunsight for ease of set-up and alignment, reverse polarity and short circuit protection, screwdriver sensitivity adjustment with LED alarm output indicator, false pulse protection, and relay or solid state alarm outputs. A suitable response time for the sensor is 15 milliseconds. The sensor unit should be contained in a sealed enclosure to avoid contamination. The sensors are mounted in recessed areas or bracketed enclosures for protection from physical damage and dirt accumulation on the photoelectric lenses. The unit is self contained and requires only power and output wire leads to the control system. The light source of the sensor preferably uses a vibration resistant, long-life light emitting diode that is frequency modulated. The phototransistor and receiver circuit respond only to the LED's narrow frequency band. The sensor operates under bright light or poor visibility conditions. The sensor is adjusted with power supplied. The range sensitivity is adjusted by holding an opaque material in front of the sensor window at the range required and turning the sensitivity screw until the alarm output LED illuminates.

FIG. 6 shows suspension control means 224 having suspension selector means 226 which, in a preferred embodiment, is an electrical switch panel positioned in the operator's cab. Selector means 226 includes a standby setting, an automatic setting, a front setting, a rear setting, a left front setting, a right front setting, a left rear setting and a right rear setting. Selector means 226 provides the selection choice to control means 230 which preferably contains a program for outputting automatic suspension adjustment signals as will be explained in greater detail below.

The standby setting provides a neutral setting where the various systems of the device are readied but not presently capable of receiving signals to perform a function.

Mode selector means 232 allows the operator to choose between one of three different suspension modes. It is preferred that the selector means also be an electrical switch which can be set either at a "suspension" mode, a "deck" mode or a "drive" mode. As will be explained in greater detail below, the suspension mode is set when maximum and minimum height adjustment of the suspension devices is desirable, as for instance, when the vehicle is overcoming a steep ramp. The "drive" mode would be set when normal, not highly inclined driving surfaces are encountered; (e.g., when travelling along a smooth runway). The "deck" mode is set when the deck is to be adjusted with respect to the cargo hold from which cargo is to be extracted or replenished.

A suspension elevation switch board 234, includes raise or lower switches which are also in communication with control means 230 to enable the operator to provide a signal to raise of lower appropriate suspension device or devices predetermined by adjustment of the suspension selector switch. As shown by reference 235, the aforementioned sensors also are in communication with control means 230. Moreover, multiple clearance indicator 236 is in communication with control means 230 and, upon instruction from control means 230, signals the operator that one or more of the sensors detect an approaching surface. Although only a single indicator 236 is shown in FIG. 6, this present invention contemplates the use of a plurality of indicators each associated with a respective one of the sensors. FIG. 6 also illustrates schematically that control means 230 is in communication with the various valves illustrated in FIG. 4 which are used to adjust the suspension devices as schematically depicted in FIG. 6 by reference number 238.

In operating suspension control system 224, mode selection means 232 is set to the desired mode. When mode selector means 232 is set to the suspension mode, suspension selector means 226 and suspension elevation switch 234 are enabled. Proximity sensor array 235 and clearance warning indicator 236 are also operational and any non-driving axle not required for that particular situation is released by activating uncoupling valve member 204 (FIG. 4).

Control means 230 monitors proximity sensor array 235 and determines when any part of the vehicle frame or chassis is closer than the allowable distance from an underlying or overlying surface and alarms the operator with the appropriate clearance warning indicator 236. As noted above, clearance warning indicator 236 can be a single light or an array of lights corresponding with sensor array 235.

If selector means 226 is set on the automatic setting, then control means 230 still activates clearance indicator 236 when a surface is detected. The operator then halts the vehicle while control means 230 automatically provides the appropriate adjustment signals to adjust suspension height to provide the necessary clearance. Control means 230 includes a preprogrammed algorithm that is based on the known sensor positions. The control means relies on the preprogrammed algorithm to position the appropriate valves to a setting which enables the chassis to be elevated until out of sensor range. The operator maintains the vehicle stationary until the clearance indicator light is deactivated.

When manual activation of the suspension adjustment is desirable, the operator halts the vehicle upon clearance indicator 236 being activated and then sets selector means 226 to the appropriate suspension device setting. The operator then uses the raise-lower switches to adjust the height of the chosen suspension device. Clearance indicator 236 will again be deactivated when the suspension adjustment results in the detected surface being out of range.

FIGS. 7A-7H show the sequence of positions air cargo transport loader 100 assumes when traversing the ramp leading into an aircraft's cargo hold.

FIG. 7A shows loader 100 approaching the ramp. Photo-electric sensors are set at a range which does not detect a surface at this point in the sequence.

Figure 7B:
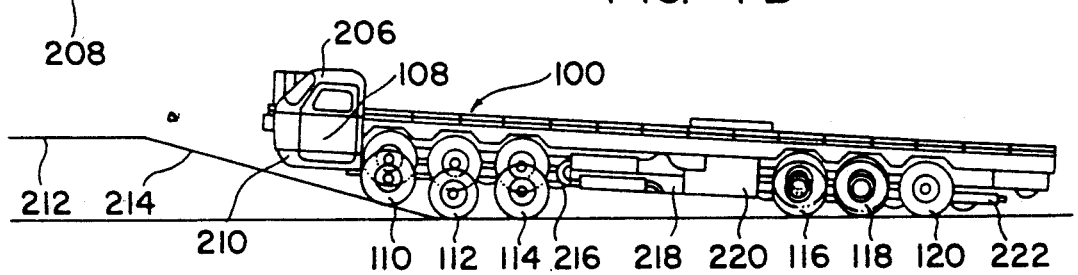

FIG. 7B shows vehicle 100 in its initial stage of traversing ramp 214. At the position shown in FIG. 7B sensor 210 and 222 detect the minimum clearance level and the operator stops the vehicle in response to the activation of the clearance indicator light. The operator then either manually sets or automatically sets the suspension system to the levels illustrated in FIG. 7B. As shown, wheel-axle set 112 is positioned at a maximum down position and wheel axle set 120 is placed in an unloaded mode and wheel-axle sets 116-118 are raised slightly.

Figure 7C:
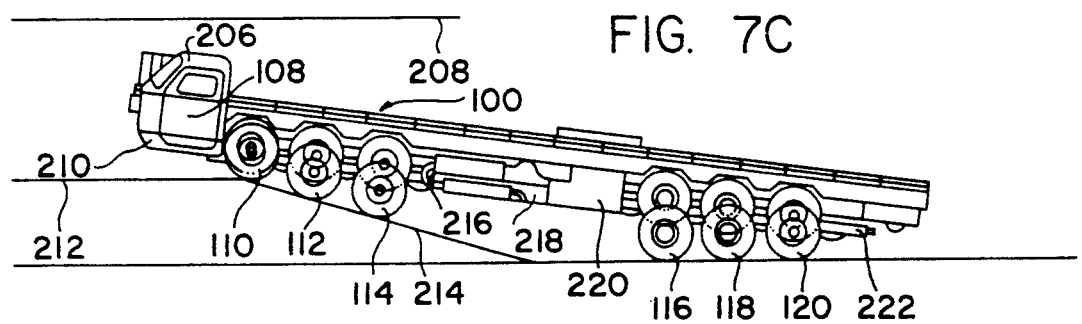

FIG. 7C shows wheel-axle set 110 about to crest ramp 214. At this point, wheel axle set 112 has been lowered from its previous position while wheel-axle sets 116 and 118 are shown further raised. Also, the suspension levels in FIG. 7C result in the axle load on wheel-axle sets 110 and 112 being essentially equal. In other words, the fluid arrangement in FIG. 4 provides equal hydraulic pressure in suspension devices 184 and 194, and equal pressure in suspension devices 196 and 202. Suspension devices 200 and 206 are not pressurized and thus carry no load. Under this condition, each axle independently strokes the distance required to contact the ramp and deliver its share of the vehicle weight to the ramp at the point of contact.

Figure 7D:
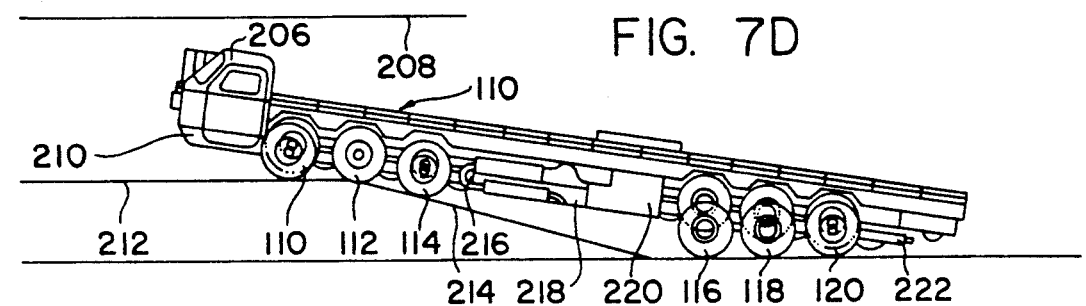

FIG. 7D shows the respective positions of the wheel-axle sets as wheel-axle set 112 is ready to crest the ramp.

Figure 7E:
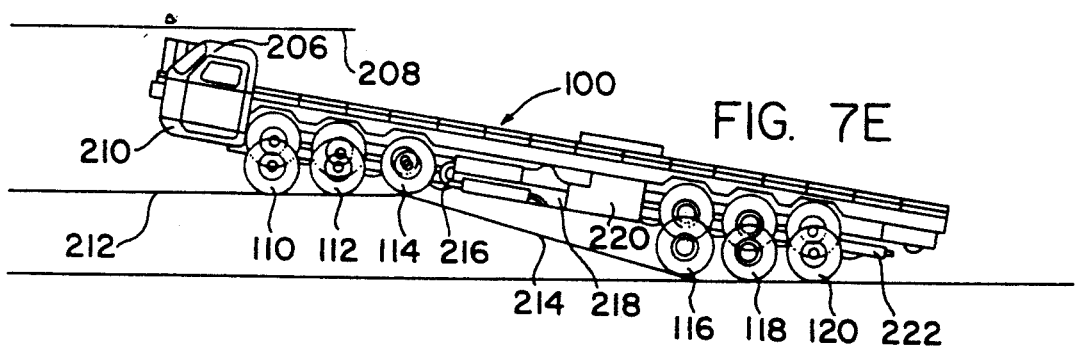

FIG. 7E shows wheel-axle set 114 just ready to crest ramp 214 and wheel-axle set 116 just entering ramp 214.

Figure 7F:
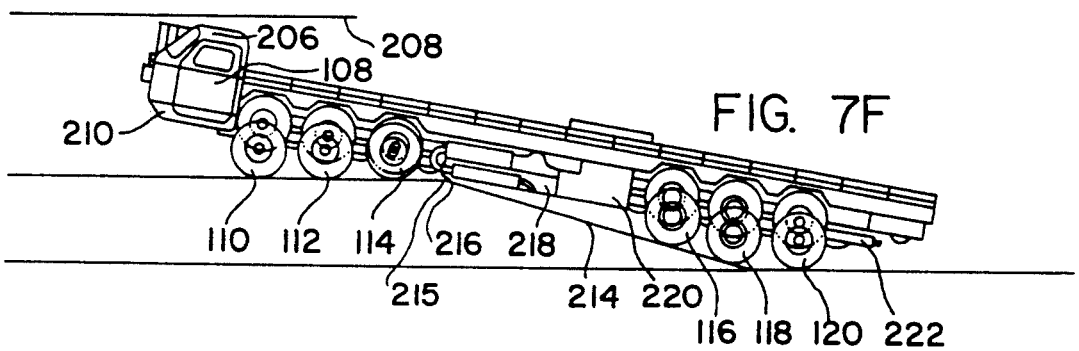

FIG. 7F shows wheel-axle set 118 just entering ramp 214. At this point, the clearance levels between surface 208 and sensor 206 and between ramp crest 215 and sensor 216 become critical. Suspension adjustments place wheel-axle sets 110 and 118 at maximum down level.

Figure 7G:
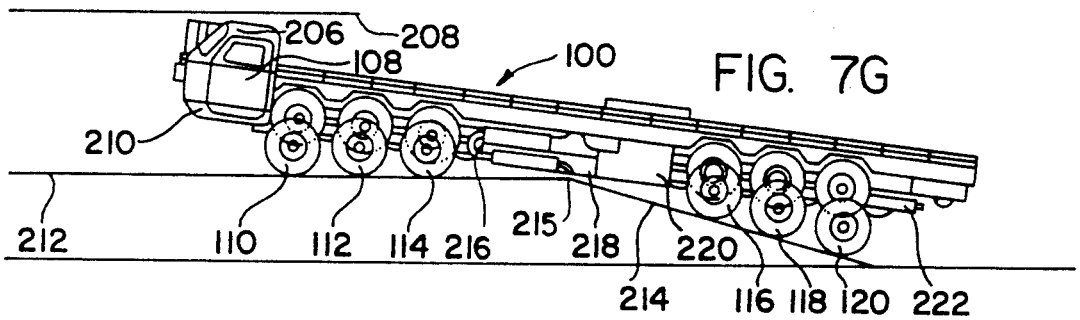

FIG. 7G shows loader 100 in a position with clearance between sensor 206 and surface 208 and between sensor 218 and ramp crest 215 at a critical stage. To compensate wheel-axle set 112 is placed in maximum down position to correspond with wheel-axle set 118 which remains in maximum down position. Wheel-axle set 120 remains in its unloaded state.

Figure 7H:
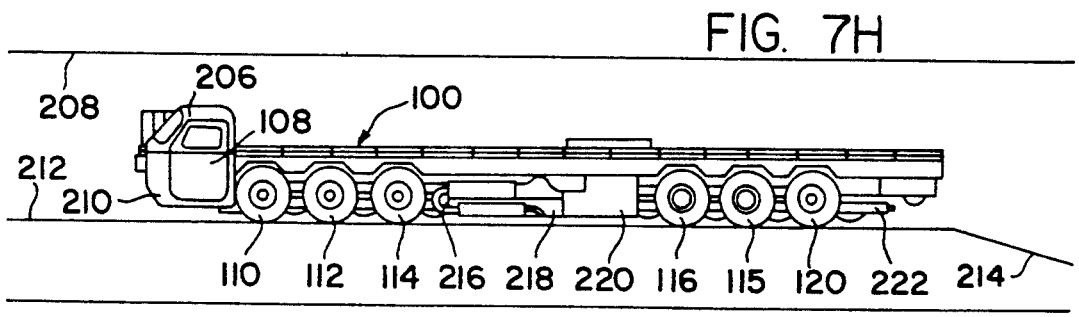

FIG. 7H shows loader 100 having completed the ramp negotiation.

DECK ATTACHMENT SYSTEM

FIGS. 8A-8D and 9-12 illustrate the deck attachment system of the present invention which connects main lift assembly 106 with deck 104 so as to enable the operator to compensate for loading level misalignments by making pitch, roll, yaw and side shift adjustments. The deck attachment system of the present invention also provides a means to maintain stability during docking impacts while providing the above described freedom of alignment.

FIGS. 8A-8D illustrate the various positions deck 104 of loader 100 is capable of assuming with respect to under-lying base frame 102 and interconnecting main lift assembly 106.

FIGS. 9-12 illustrate deck attachment systems 240, 240' and their relationship with main lift assembly 106 and deck 104.

FIG. 8A shows loader 100 in a forward pitch position having a preferred maximum pitch angle of 6°. A corresponding rearward pitch is also made possible by deck attachment systems 240 and 240' shown in FIGS. 9-12.

FIG. 8B shows a rear end view of loader 100 in a left roll position with a preferred maximum roll angle of 4°. A corresponding right roll position would also be possible with deck attachment system 240.

FIG. 8C shows a planar view of loader 100 in a counter clockwise yaw shift at a preferred maximum distance of 3 inches. Again, a corresponding clockwise yaw shift is also possible with deck attachment systems 240 and 240'.

FIG. 8D shows, in dashed lines, loader 100 in a left side shift position of a preferred maximum distance of 3 inches. A corresponding right side shift is also possible with deck attachment systems 240 and 240'.

FIG. 9, is a cross-sectional end view of deck 104 showing a partially cut away view of main lift assembly 106, and deck attachment system 240, which connects the former two structures. Deck 104 in FIG. 9 is shown not to be effected by pitch, roll, yaw or side sift forces. As shown in FIG. 9, a pair of transversely spaced slide block housings 242 and 244 are secured to under surface 246 of deck 104. Within slide block housing 242 is positioned slide block 248 adapted to slide transversely within the elongated housing 242. To facilitate sliding between block 248 and housing 242, lubrication or low friction bearing material can be used.

Slide block 248 has a ball-shaped socket formed therein which receives ball-end 250 of linking member 252. Linking member 252 is connected at its opposite end to roll cylinder block 254 and preferably is in the form of a hydraulic cylinder such that a certain degree of deck manipulation freedom is achieved. Upper left forward lift arm 255 (FIG. 1.), forming part of main lift assembly 106, includes two side flanges 256, 258 which are pivotally joined to opposite sides of roll cylinder block 254 with trunnion mounts 260, 262. The arrangement on the opposite side of deck 104 with slide block 248', link member 252' ball end 250', roll cylinder block 254' and trunnion mounts 260' and 262' is similar to that described for the left side counterparts. Also, forward upper right lift arm 138 includes flanges 256' and 258' whose inside surfaces are secured to trunnion mounts 260' and 262'.

Extending between interior flanges 258 and 258' of upper arms 255 and 138, respectively, is transversely extending cross connecting member 264. Cross connecting member 264 is joined at its ends to interior trunnion mounts 262 and 260'. Cross connection member 264 also includes bearing mounts 266, 268 about which flanges 258 and 258' pivot. Elastic collar 270 surrounds the central portion of connecting member 264.

Extending downwardly off deck under surface 246 is bearing box assembly 272 with bearing box 274.

An aft deck attachment system 240' shown particularly in FIGS. 11 and 12 includes another pair of slide block housings and associated structure as described above for connection with the upper lift arms. Since the relationships between the various deck attachment system elements is the same for both the forward and aft deck attachment systems 240, and 240', only the forward deck attachment system 240 has been described in detail.

FIG. 10 illustrates the relative position of the elements comprising deck attachment system 240 when loader 100 is in a right roll. The roll maneuver shown in FIG. 10 is accomplished by extending the link members on the one side of deck 104 as respresented by the front right side link member 252' and allowing deck 104 to roll about the ball-in-socket connections between the link members on the left side of deck 204 and slide by way of the slide blocks. The freedom of rotation of the ball joints and the side shifting of the slide blocks compensate for the changes in horizontal position of deck 104. The slide block housings (e.g. 242 and 244) preferably include about a 3" clearance between the ends of the elongated slide block housing and a centered slide block.

FIG. 11 shows, in cut away fashion, a side view of forward deck attachment system 240 and rearward deck attachment system 240' while loader 100 is in a pitch position such as that represented by FIG. 8A. The pitch maneuver is accomplished by lowering or raising either the forward pair of arm means or the rearward pair of arm means relative to the other pair to allow up to a nominal 6 degree of pitch. All of the 6 degree pitch orientation can be achieved through sole use of the forward and aft pairs of arm means. Alternatively, a portion of the pitch angle can be achieved through the added use of the forward and aft pairs of linking members. The freedom of rotation of the ball joints and clearance about the transverse connecting means compensates for the change in horizontal distance.

FIG. 12 illustrates front and aft deck attachment systems 240 and 240' each having a hydraulic member 276, 276' fixed to the under surface 241 of deck 104. Hydraulic members 276, 276' are positioned essentially planar and are pivotally connected with the under surface of deck 104. Longitudinally extending bracket members 278, 278' interconnect a free end of hydraulic members 276, 276' to a flange portion of longitudinally spaced upper arm members 138 and 144. A side shift adjustment, such as that illustrated in FIG. 8D, is accomplished by sliding the slide blocks positioned at both the forward and aft end with hydraulic cylinders 276, 276'. The 3 inch clearance to each side of the slide blocks with respect to the slide block housings allows for up to a 3 inch side shift to one side or the other.

The yaw maneuver shown in FIG. 8C is accomplished in a somewhat similar fashion as that of the side shift except one cylinder would extend while the other one remains stationary or retracts in an opposite direction. A rotation about the vertical center line of deck 104 of about 3 inches at the deck ends is thus made possible. In both the side shift and yaw maneuvers, the side-to-side clearance of the slide blocks as well as the rotation of the linking members ball end provides the required degree of freedom.

CAB RELOCATION SYSTEM

FIGS. 1, 13 and 14 illustrate the cab relocation system of the present invention.

FIG. 1 illustrates the air cargo transport loader 100 having a modified deck structure. As shown in FIG. 1, deck 104 includes deck section 280 directly adjacent operator's cab 108. Deck section 280 is received within cutout 281 formed in deck 104 such that when deck section 280 is in the position shown in FIG. 1, deck section 280 is essentially coplanar with the deck's upper surface 283. As shown in FIG. 1, deck 104 includes catwalks 152, 154 and handrails 156, 158 positioned to each side of conveyance means 282 which includes rollers 160, 162 and guide rails 164.

FIG. 13 illustrates cab 108 in a stowed position. FIG. 13 further reveals deck section 280 in its stowage position. Deck section 280 is pivotally affixed at 284 to deck 104. Pivotable deck section 280 also includes a lever extension 286 and a hydraulic cylinder 288 having one end pivotally connected to extension 286 and a second end secured to an understructure portion 290 of deck 104 (e.g. an elongated section of bearing box assembly 272). As shown in FIG. 13, when hydraulic cylinder 288 is extended deck section 280 pivots about pivot point 284 into a position wherein cab 108 can be received in cutout 281.

FIG. 13 also reveals that cab 108 has a top section above deck 104 and a bottom below deck 104. Base frame 102 is thus designed with an appropriate recessed area for receiving the lower end of cab 108. Cab 108 is secured at the mid region of its interior side 292 to cantilever support beam 294 received in channel guide retainer 296 which can also be supported by deck understructure 290. Adjacent channel guide retainer 296 is telescoping arm 298 also preferably affixed to deck understructure 290. Telescoping arm 298 is secured at one end to the side 292 of cab 108 and, as shown in FIG. 13, is designed to draw cab 108 into a storage or stowage position by retraction and retain the cab in a storage position until extended.

FIG. 14 illustrates cab 108 in its usual operating mode with cab 108 positioned to one side of deck 104 as also shown in FIG. 1. When cab 108 is in its outward position, hydraulic member 288 is in a retracted position so as to provide an uninterrupted conveying surface. Hinged deck section 280 is also provided with a plurality of rollers 300 as shown in FIG. 1. Also, the exterior end of deck section 280 is provided with releasable locking means for releasibly locking deck section 280 to the interior side 292 of cab 108. Hence, hinged deck section 280 provides further stability and support to cab 108 when secured thereto. FIG. 14 further illustrates telescoping arm 298, and cantilever support 294 in their fully extended position.

The cab relocation system described above thus provides added stability to cab 108 by utilizing a portion of the deck structure to connect with the cab when cantilever support 294 is in its most extended position. The cab relocation system also provides for quick transfer of the cab from one position to the other.

Table I below provides an estimation of the time required for cab transference made possible with the present invention when the releasable locking means securing cab 108 to hinged deck section 280 are bolts.

TABLE 1

| OPERATION | TASK DESCRIPTIONS | CAB RELOCATION SYSTEM FASTENERS REMOVED | TOOLS REQUIRED | NO. MEN | TIME ESTIMATE |
|---|---|---|---|---|---|
| 1. Step Removal | To begin cab relocation, the operator removes the step assembly located on the back of the cab. This is held in place by two ⅜ in. bolts that are removed by a ratchet kept in the cab. When the bolts are free, the assembly is held in place by two slides so the operator can lift the assembly clear of the cab slides and set it on the deck for the other operator to secure. | (2) ⅜ in. bolts | Ratchet and socket | 1 | 2 min to get socket/wrench and remove two bolts |
| 2. Unbolt Hinged Deck Section | The operator then removes a ½ in. bolt in the hinged deck section behind the cab and one on the front side, storing these bolts and the socket wrench back in the cab. | (2) ½ in. bolts | Ratchet and socket | | 2 min to disconnect cab fuel line and remove tank |
| 3. Rotate Deck Section and cab | While in the cab, the operator is now ready to start the loader and bring the hydraulic system up to pressure. (In extreme cold conditions where a system warm-up time is anticipated, the operator would have started the engine in the first step.) Moving to the front of the deck, the operator reaches underneath to the deck manual control valve and powers the movable deck section to its fully rotated position. With the deck up, the operator can now power the cab laterally using the manual control valve located under the deck in the same area as the rotation valve. During this operation, he will carefully monitor the umbilical line retraction and adjust/secure them as required. | | | | 2 min to remove ½ in. bolts 2 min to store wrench, start loader, and and bring hydraulic pressure up 2 min to power deck up 2 min to power cab over Cab Relocation Total = 14 min |

NOTE: This estimate is based on the assumption that the operators start these operations from on the deck, and that inclement weather is not a factor in opeations. (i.e., does not affect operator dexterity or engine/hydraulic warm-up).

What is claimed is:

1. A vehicle, comprising:
an upper support structure;
a lower support structure;
securement means for securing said upper support structure to said lower support structure, said securement means including:
slide block housings attached to an undersurface of said upper support structure,
slide-blocks positioned in said slide block housings;
link members each having a ball end received within a ball socket formed in said slide blocks; and
attachment means for attaching the opposite ends of said link members to said lower support structure.

2. A vehicle as recited in claim 1 wherein there are two pairs of slide block housings with one pair positioned at one end of said upper support structure in a transversely spaced arrangement and the other pair of said slide block housings being positioned at the other end of said support structure in a transversely spaced arrangement.

3. A vehicle as recited in claim 2 wherein said slide blocks, when centered within said side block housings are free to shift about 3 inches to each side of said centered slide block.

4. A vehicle as recited in claim 1 wherein said attachment means comprises roll cylinder blocks each receiving an end of a respective one of said link members in locking fashion, arm members extending from said lower support structure to a respective one of said roll cylinder blocks, said arm members being pivotably joined to said roll cylinder blocks.

5. A vehicle as recited in claim 4 wherein said arm members pivot with respect to said roll cylinder blocks about an axis parallel to the direction said slide blocks slide within said slide block housings.

6. A vehicle as recited in claim 4 wherein each of said arm members includes an upper lift member having flange extensions extending to opposite sides of a respective one of said roll cylinder blocks and said extensions being connected to a respective one of said roll cylinder blocks in trunnion fashion.

7. A vehicle as recited in claim 4 wherein said attachment means further includes transverse connecting members which extend between transversely spaced pairs of said roll cylinder blocks and are connected at opposite ends to a transversely spaced pair of arm members.

8. A vehicle as recited in claim 7 wherein said attachment means further comprises damping means connected with said arm members for shifting said upper support structure with respect to said lower support structure essentially parallel with the central axis of said connecting member.

9. A vehicle as recited in claim 8 wherein said damping means comprises hydraulic cylinders.

10. A vehicle recited in claim 8 further comprising a beam box extending below the undersurface of said upper support structure, and said connecting member having an elastic member attached to said connecting member and positioned so as to come in contact with said beam box when said connecting member substantially deviates from a central position within said beam box.

11. A vehicle as recited in claim 1 wherein said vehicle is a cargo loader and said upper support structure is a deck having rollers for assisting in the movement of cargo on said deck.

12. A vehicle as recited in claim 1 wherein said vehicle is a cargo loader with said upper support structure is a cargo deck and said attachment means including means for raising and lowering said cargo deck.

13. A vehicle as recited in claim 1 wherein said link members have means for extension and retracting.

* * * * *